UNITED STATES PATENT OFFICE.

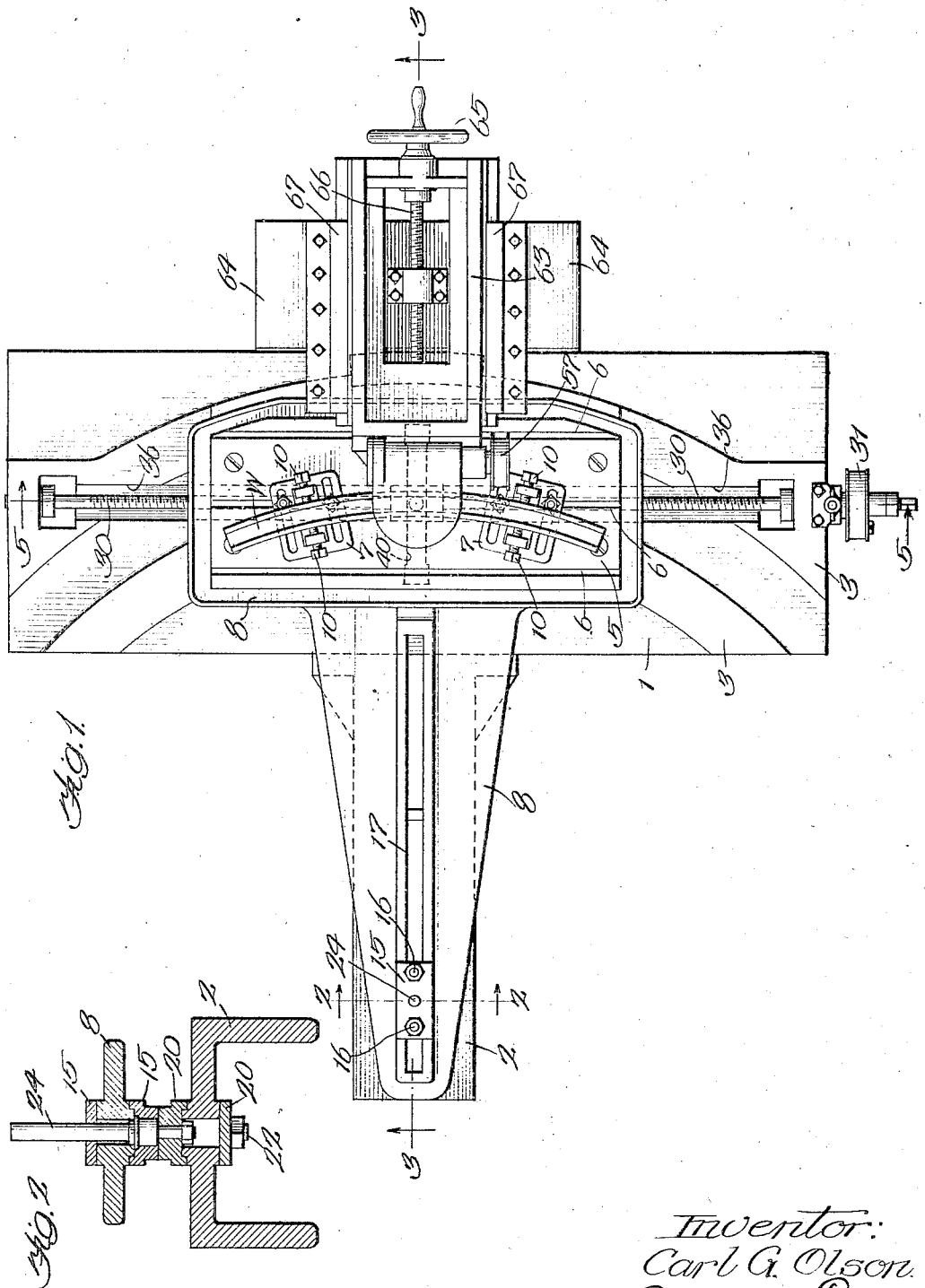

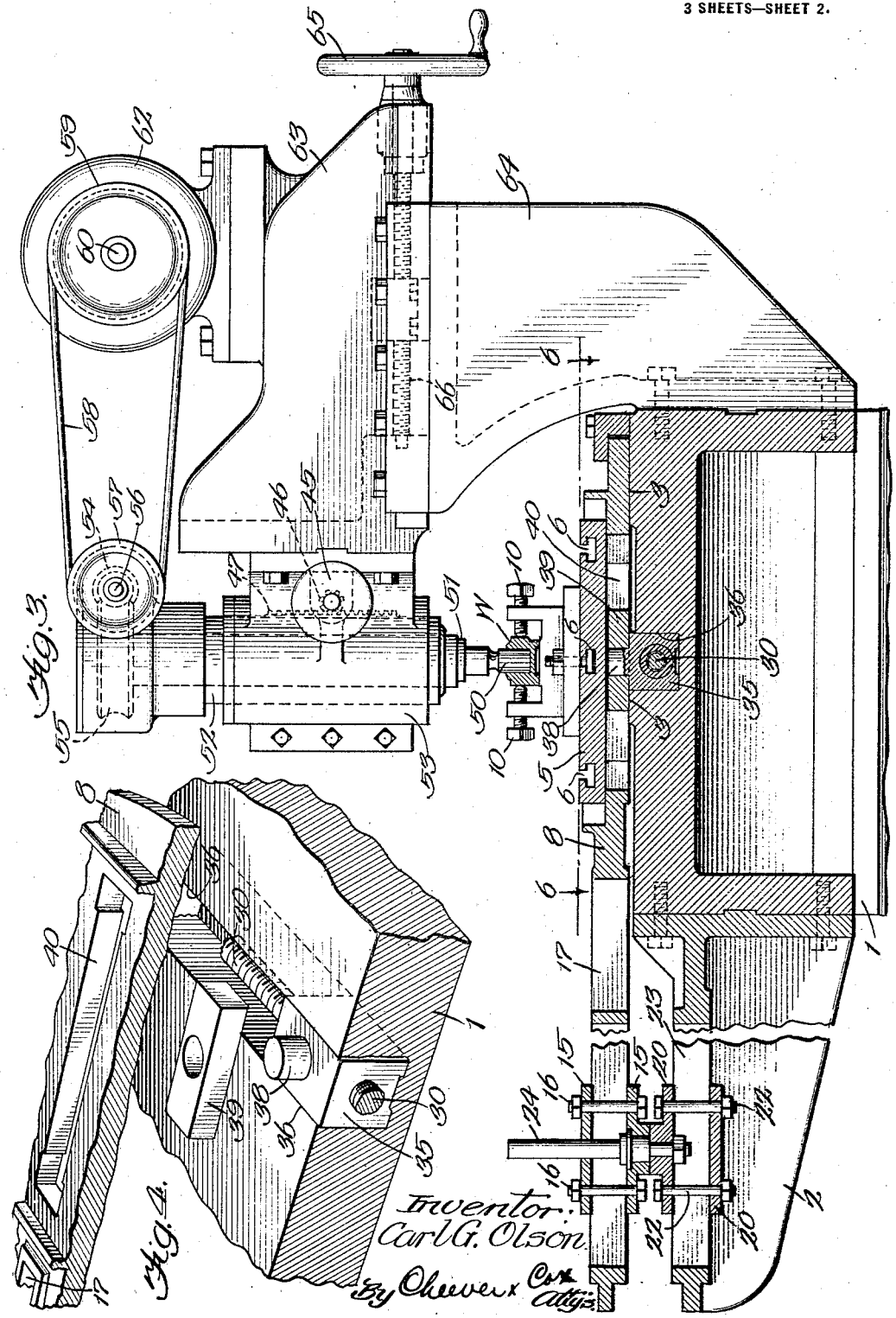

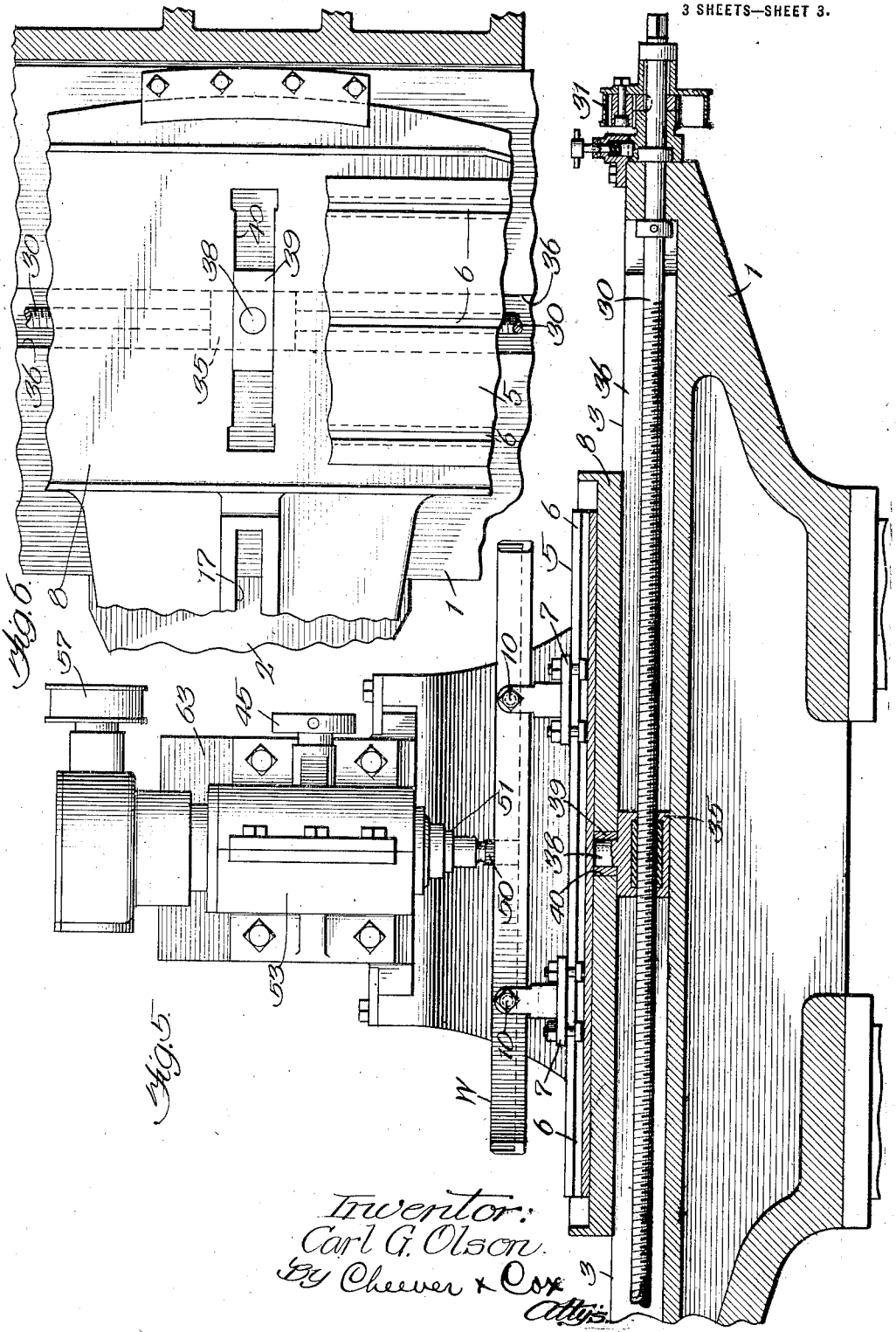

CARL G. OLSON, OF CHICAGO, ILLINOIS, ASSIGNOR TO ILLINOIS TOOL WORKS, OF CHICAGO, ILLINOIS, A CORPORATION OF ILLINOIS.

RADIAL MILLING-MACHINE.

1,362,816.   Specification of Letters Patent.   Patented Dec. 21, 1920.

Application filed November 1, 1918. Serial No. 260,748.

*To all whom it may concern:*

Be it known that I, CARL G. OLSON, a citizen of the United States, residing at Chicago, in the county of Cook and State of Illinois, have invented a certain new and useful Improvement in Radial Milling-Machines, of which the following is a specification.

My invention relates to machine tools, especially milling machines, and the invention is particularly applicable in cases where it is desired to produce a finished surface upon a segmental or arcuate piece of work. In other words the special applicability of my invention lies in those cases where it becomes desirable to produce a finished surface conforming to the arc of a circle in distinction to a complete circle. Broadly stated, the object of the invention is to provide feed mechanism which will act tangentially or approximately at the point of tangency for various radii of curvature. In most boring mills or in turret lathes or milling machines having work tables rotating in a horizontal plane, the work table or turn table is driven by a shaft or other power device located at the axis of the table, and an arm extends over the table from an upright at the side of the table for carrying the tool. The center of the table is fixed and the radius of curvature is increased or decreased by decreasing or increasing the distance of the tool from the upright which supports it. Thus, when taking a cut having a small radius of curvature the tool is located at a comparatively great distance from the point of support. This induces strain in the upright and in the overhanging arm which carries the tool and tends to impair the inaccuracy of the work. When taking a cut having a large radius of curvature, the resistance created by the tool is at a comparatively great distance from the shaft or other device which furnishes the power to the work table, hence a great strain is generated in the work table. In any event, as the power device or feed for rotating the work table is at the center of the table and the tool is supported from a point beyond the edge of the table a strain is always generated and the farther the tool is away from the center of the work table the greater will be the strain in the work table, while the nearer the tool is to the center of the work table the greater will be the strain in those portions of the machine which carry the tool. Under either of these conditions it is necessary to build both portions of the machine strong enough to endure the maximum strain. This requires a relatively heavy construction and is apt to introduce inaccuracy in the work. It is my purpose to avoid such strains and inaccuracies and in carrying out my invention I provide a work table or work holder having a variable center, and feed mechanism, the axis whereof passes through or near the axis of the tool.

I obtain this and contributory objects of the invention which will be hereinafter explained, by the mechanism illustrated in the accompanying drawings, in which—

Figure 1 is a top plan view of the machine.

Fig. 2 is a sectional detail on the line 2—2, Fig. 1.

Fig. 3 is a side elevation partly in section on the line 3—3, Fig. 1.

Fig. 4 is a distributed perspective illustrating the relationship of the parts which connect the feed screw with the work table.

Fig. 5 is a sectional elevation on the line 5—5, Fig. 1.

Fig. 6 is a top plan view of the parts shown in Fig. 4.

Similar numerals refer to similar parts throughout the several views.

The machine has a main bed 1 having an apron 2 extending from one side. On the top of the main frame are finished surfaces 3, 3 on which the work table slides. The work table is T-shaped, having a head 5 provided with T slots 6, 6 for fastening the clamps 7, 7 and an extension 8 which overlies the apron 2. By reference particularly to Fig. 1 it will be seen that the slides 3 are in the form of an arc centered somewhere near the end of the apron 2 and extension 8. Consequently, said parts 2 and 8 may be regarded as the radii of a circle at the center of the slides 3, and the machine may appropriately be termed a "radial milling machine."

The clamps 7 above mentioned may be of any suitable design and in the present case are provided with set screws 10, 10 for holding in the position the work W.

The work table is pivotally connected to the apron 2 by mechanism which is shown in vertical section in Figs. 2 and 3. In general the pivot consists of a pair of plates 15, 15 held in place on the table by means of studs 16, 16 passing through a radial slot 17 formed in the extension 8. Also a pair of plates 20, 20 held in place on the apron by means of studs 22, 22 passing through a radial slot 23 formed in said apron. A pivot pin 24 passes through the three upper plates and serves as an axis for them. By loosening the studs 16 and 22 and sliding the pivot mechanism longitudinally in the slots 17 and 23 the center rotation of the work table may be varied.

The feed mechanism is shown in perspective in Fig. 4. It includes a feed screw 30 journaled in the bed 1 and rotated by any suitable power device which I have indicated in general in Figs. 1 and 5 by the reference numerals 31. This mechanism need not be described in detail here as any means for slowly rotating the feed screw may be employed. The mechanism here shown is, however, described in detail in a copending application filed by me on even date herewith, Serial Number 260,747. The feed screw works in a nut 35 traveling in guide 36 in the bed 1. Said nut has an upstanding stud 38 which fits rotatably within a block 39 which travels in a slot 40 arranged radially in the work table 8. It is evident that when the feed screw rotates it causes the nut 35 to travel along the slot formed in the table, and this, acting through the stud 38 and block 39 causes the work table to swing in an arc about the pivot pin 24 as a center.

The tool may be a mere non-rotative planer tool, but ordinarily will be a rotatable tool such as the milling cutter 50 shown in the drawing. This is mounted in a spindle 51 carried by a sleeve 52 fastened in a housing 53. The spindle is rotated by a worm 54 meshing with a worm 55, fastened to the spindle as indicated in dotted lines near the top of Fig. 3. According to the design shown the worm shaft 56 is driven by a sheave 57 which in turn is driven by a belt 58 from the driving sheave 59 secured to the power shaft 60. By preference the power shaft is the shaft of an electric motor 62 mounted upon a carriage 63 slidable upon the bracket 64 rising from the side of the bed 1. These last mentioned parts are shown in side elevations in Fig. 3. The sleeve 52 is vertically adjustable in the housing 53 by a hand wheel 45 having a pinion 46 meshing with a rack 47 on the sleeve. A hand wheel 65 rotates an adjusting screw 66 for causing the carriage 63 to slide forward or back in the guides 67. It will be observed that said guides are arranged lengthwise with the apron 2. Consequently, by rotating the screw 66 the carriage may be adjusted radially.

In operation, the work W is clamped to the work table and the pivot mechanism is so adjusted that the pivot pin 24 will come at the center of the arc called for in the finished work. The carriage 63 does not overhang the edge of the work table to any great extent, and while said carriage is adjustable readily, the axis of the tool 50 will ordinarily pass approximately through the axis of the feed screw 30. Hence the strain which is generated by the tool acting upon the work comes practically at the point of application of the power of the feed screw, and as the overhang of the carriage and bracket 64 is slight the leverage is reduced to a minimum. The increase or decrease in the radius of curvature is obtained by shifting the pivot of the work table, and this dispenses with the need of shifting the tool relatively to the bed except for minor adjustments necessitated by the taking of a fresh cut or the substitution of a tool of larger or smaller diameter. Ordinarily there is little strain generated at the pivot pin 24 because the point of application of the resistance of the tool is located substantially at the point of application of the power of the feed screw, and these are remote from the center of rotation of the work table. Consequently, great strength and accuracy of work is produced with a minimum of weight in the machine, and a minimum of strain generated in the various parts of the machine.

Having thus described my invention, what I claim as new and desire to secure by Letters Patent, is:—

1. A milling machine having a stationary bed, a work table slidable on said bed through a limited arc, a feed screw mounted in the bed for swinging the work table, and a centering device adapted to serve as a pivotal connection between the work table and the bed, said centering device being shiftable upon the bed in a direction at right angles to the feed screw.

2. A milling machine having a stationary bed, a work table slidable on said bed through a limited arc, a feed screw mounted in the bed for swinging the work table, a centering device for pivotally connecting the work table to the bed, and means whereby the centering device may be shifted radially with respect to the work table, and relatively to the bed in a direction transverse to the feed screw.

3. In a machine of the class described, the combination of a bed, a tool holder carried by the bed, a segmental work table, a feed screw for swinging the work table upon the bed through a limited arc, the work table and the bed having slots at right angles to the feed screw, a pivot pin for connecting the work table to the bed, and clamping means slidable in said slots for enabling the position of the pin to be altered relatively to the work table and bed.

4. A radial milling machine having a stationary bed, a segmental work table slidable thereon, a pivot connection between the work holder and the bed, and feed mechanism for swinging the work holder through a limited arc about its pivot, said feed mechanism including a feed screw mounted in the bed, and arranged tangentially at one side of the axis of the work table, and a nut coöperating with said screw and articulately engaging the work table for swinging it.

5. A radial milling machine having a stationary bed, a segmental work table slidable thereon and pivotally connected thereto, a feed screw mounted in the table at one side of the axis of rotation of the work table, a nut slidable in the table and coöperating with the feed screw, the work table having a slot transverse to the feed screw when the work table is in central position, and a connecting block slidable in said slot and articulately connected to the nut for the purpose described.

6. A radial milling machine having a stationary bed, a tool holder above the bed having a vertical axis of rotation, a work table beneath the tool holder pivoted to the bed at a point remote from the point where the produced axis of the tool holder passes through the bed, and a feed screw for swinging the work table through a limited arc beneath the tool, said feed screw being arranged horizontally and its axis intersecting, approximately, the produced axis of the tool holder.

7. A radial milling machine having a stationary bed, a tool holder above the bed having a vertical axis of rotation, a work table beneath the tool holder pivoted to the bed at a point remote from the point where the produced axis of the tool holder passes through the bed, a centering device for pivoting the work table to the bed, said centering device being adjustable upon the bed nearer to and farther from the produced axis of the tool holder, and a feed screw for swinging the work table through a limited arc beneath the tool, said feed screw being arranged horizontally and its axis intersecting, approximately, the produced axis of the tool holder.

8. A radial milling machine having a stationary bed, a tool holder above the bed having a vertical axis of rotation, a work table beneath the tool holder pivoted to the bed at a point remote from the point where the produced axis of the tool holder passes through the bed, a centering device for pivoting the work table to the bed, said centering device being adjustable upon the work table nearer to and farther from the produced axis of the tool holder, and a feed screw for swinging the work table through a limited arc beneath the tool, said feed screw being arranged horizontally and its axis intersecting, approximately, the produced axis of the tool holder.

9. A radial milling machine having a stationary bed, a tool holder above the bed having a vertical axis of rotation, a work table beneath the tool holder pivoted to the bed at a point remote from the point where the produced axis of the tool holder passes through the bed, a centering device for pivoting the work table to the bed, said centering device being adjustable relatively to the work table and relatively to the bed in a direction toward and from the produced axis of the tool holder, and a feed screw for swinging the work table through a limited arc beneath the tool, said feed screw being arranged horizontally and its axis intersecting, approximately, the produced axis of the tool holder.

In witness whereof, I have hereunto subscribed my name.

CARL G. OLSON.